United States Patent
Mittal

(10) Patent No.: US 8,499,012 B1
(45) Date of Patent: Jul. 30, 2013

(54) SYSTEM AND METHOD FOR ATTACHED STORAGE STACKING

(75) Inventor: Millind Mittal, Palo Alto, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 416 days.

(21) Appl. No.: 12/818,870

(22) Filed: Jun. 18, 2010

(51) Int. Cl.
  *G06F 12/00* (2006.01)
  *G06F 17/30* (2006.01)
  *G06F 7/00* (2006.01)

(52) U.S. Cl.
  USPC ............................. 707/827; 709/230

(58) Field of Classification Search
  USPC ............... 707/827; 709/223, 230; 711/147
  See application file for complete search history.

(56) References Cited

U.S. PATENT DOCUMENTS

| | | | | |
|---|---|---|---|---|
| 501,350 A | * | 7/1893 | Kuntz | 43/121 |
| 1,024,767 A | * | 4/1912 | Dempster | 43/121 |
| 2,100,909 A | * | 11/1937 | Mora | 43/121 |
| 4,423,564 A | * | 1/1984 | Davies et al. | 43/121 |
| 5,090,153 A | * | 2/1992 | Mullen et al. | 43/114 |
| 5,999,179 A | * | 12/1999 | Kekic et al. | 715/734 |
| 6,425,202 B1 | * | 7/2002 | Lin et al. | 43/107 |
| 7,313,614 B2 | * | 12/2007 | Considine et al. | 709/223 |
| 7,529,807 B1 | * | 5/2009 | King et al. | 709/217 |
| 2003/0028731 A1 | * | 2/2003 | Spiers et al. | 711/147 |
| 2004/0059822 A1 | * | 3/2004 | Jiang et al. | 709/230 |
| 2007/0220225 A1 | * | 9/2007 | Nakamura et al. | 711/162 |
| 2009/0077327 A1 | * | 3/2009 | Hara | 711/154 |
| 2011/0047860 A1 | * | 3/2011 | Black et al. | 43/123 |

* cited by examiner

*Primary Examiner* — Kuen S Lu
*Assistant Examiner* — Sabana Rahman
(74) *Attorney, Agent, or Firm* — Turocy & Watson, LLP

(57) ABSTRACT

A system and method are provided for stacking storage drives in a network attached storage (NAS) system. The method provides a NAS stacking network including at least a first and second stackable building block (SBB), where each SBB includes a head, with an embedded processor and storage application, and a storage drive including client files. The method connects a first interface of the first SBB to a client computer device via a LAN switch, and connects a second interface of the first SBB to the first interface of the second SBB. A directory is built of client files stored in the first and second SBBs. The directory is maintained in both the first and second SBBs. In one aspect, the first SBB, acting as a primary SBB, provides access to NAS stacking network directory structure in response to an inquiry from a client computer connected to the LAN switch.

19 Claims, 5 Drawing Sheets

SYSTEM AND METHOD FOR ATTACHED STORAGE STACKING

BACKGROUND OF THE INVENTION

1. Field of the Invention

This invention generally relates to network-attached storage (NAS) and, more particularly, to a system and method for stacking storage drives in a NAS.

2. Description of the Related Art

FIG. 1 is a schematic block diagram of a direct-attached storage (DAS) system (prior art). A DAS is a digital storage system directly attached to a server or workstation, without a storage network in between. A DAS can be differentiated from a system area network (SAN) or network-attached storage (NAS). A typical DAS system is made of a data storage device 100 (for example, an enclosure holding a number of hard disk drives) connected directly to a computer 102 through a host bus adapter (HBA) and universal serial bus (USB) interface. Between those two points there is no network device, such as a hub, switch, or router. The main protocols used for DAS connections are ATA, SATA, eSATA, SCSI, SAS, and Fibre Channel.

A DAS device can be shared between multiple computers, as long as it provides multiple interfaces (ports) that allow concurrent and direct access. In fact, most SAN-attachable storage devices or NAS devices can be easily used as DAS devices—all that is needed is to disconnect their ports from the data network and connect one or more ports directly to a computer with a cable. The disadvantages of DAS include an inability to share data or unused resources with other servers. Both NAS and SAN architectures attempt to address this, but introduce some new issues as well.

FIG. 2 is a schematic block diagram of a NAS system (prior art). A NAS 200 is file-level computer data storage connected to a computer network, via a network switch 202, providing data access to heterogeneous network clients (e.g., client 204). A NAS unit is a computer connected to a network that only provides file-based data storage services to other devices on the network. Although it may technically be possible to run other software on a NAS unit, it is not designed to be a general purpose server. For example, NAS units usually do not have a keyboard or display, and are controlled and configured over the network, often using a browser. A fully-featured operating system is not needed on a NAS device, so often a stripped-down operating system is used. For example, FreeNAS, an open source NAS solution designed for commodity PC hardware, is implemented as a stripped-down version of FreeBSD.

FIG. 3 is a schematic block diagram of a NAS system with multiple disk drives (prior art). NAS systems typically include one or more hard disks 206, often arranged into logical, redundant storage containers or RAID arrays (redundant arrays of inexpensive/independent disks). From the point of view of keeping technology purchasing simple, it is preferred to not expose customers to the notion of disk-drives. Instead, the disk drives are presented as a network based storage, e.g., NAS, or storage based upon a peripheral interconnect, e.g., a USB based DAS. At disk drive level, there are many manufacturers, and hence the issue of having to specify which drives are supported.

NAS removes the responsibility of file serving from other servers on the network. NAS uses file-based protocols such as NFS (popular on UNIX systems), SMB/CIFS (Server Message Block/Common Internet File System) (used with MS Windows systems), or AFP (used with Apple Macintosh computers). NAS units rarely limit clients to a single protocol.

NAS provides both storage and a file system. A file system is a method of storing and organizing computer files and their data. Essentially, it organizes these files into a database for the storage, organization, manipulation, and retrieval by the computer's operating system. File systems are used on data storage devices such as a hard disks or CD-ROMs to maintain the physical location of the files. Beyond this, they might provide access to data on a file server by acting as clients for a network protocol. It is distinguished from a directory service and registry.

Most file systems make use of an underlying data storage device that offers access to an array of fixed-size physical sectors, generally a power of 2 in size (512 bytes or 1, 2, or 4 kB are most common). The file system is responsible for organizing these sectors into files and directories, and keeping track of which sectors belong to which file and which are not being used. Most file systems address data in fixed-sized units called "clusters" or "blocks" which contain a certain number of disk sectors (usually 1-64). This is the smallest amount of disk space that can be allocated to hold a file.

A file name is a name assigned to a file in order to secure storage location in the computer memory. By this file name a file can be further accessed. Whether the file system has an underlying storage device or not, file systems typically have directories which associate file names with files, usually by connecting the file name to an index in a file allocation table of some sort, such as the FAT in a DOS file system, or an inode in a Unix-like file system. Directory structures may be flat, or allow hierarchies where directories may contain subdirectories. In some file systems, file names are structured, with special syntax for filename extensions and version numbers. In others, file names are simple strings, and per-file metadata is stored elsewhere.

Metadata is bookkeeping information typically associated with each file within a file system. The length of the data contained in a file may be stored as the number of blocks allocated for the file or as an exact byte count. The time that the file was last modified may be stored as the file's timestamp. Some file systems also store the file creation time, the time it was last accessed, and the time that the file's meta-data was changed. Other information can include the file's device type (e.g., block, character, socket, subdirectory, etc.), its owner user-ID and group-ID, and its access permission settings (e.g., whether the file is read-only or executable).

NAS is useful for more than just general centralized storage provided to client computers in environments with large amounts of data. NAS can enable simpler and lower cost systems such as load-balancing and fault-tolerant email and web server systems by providing storage services. The potential emerging market for NAS is the consumer market where there is a large amount of multi-media data. Such consumer market appliances are now commonly available. Unlike their rack-mounted counterparts, they are generally packaged in smaller form factors. The price of NAS appliances has plummeted in recent years, offering flexible network-based storage to the home consumer market for little more than the cost of a regular USB or FireWire external hard disk. Many of these home consumer devices are built around ARM, PowerPC, or MIPS processors running an embedded Linux operating system.

It would be advantageous if disk drives in a NAS system could be added, removed, and replaced without the requirement of rebuilding the file directory.

SUMMARY OF THE INVENTION

Accordingly, a method is provided for stacking storage drives in a network attached storage (NAS) system. The method provides a NAS stacking network including at least a first and second stackable building block (SBB), where each SBB includes a head, with an embedded processor and storage application, and a storage drive including client files. The method connects a first interface of the first SBB to a client computer device via a LAN switch, and connects a second interface of the first SBB to the first interface of the second SBB. A directory is built of client files stored in the first and second SBBs. The directory is maintained in both the first and second SBBs.

In one aspect, the first SBB, acting as a primary SBB, provides access to NAS stacking network directory structure in response to an inquiry from a client computer connected to the LAN switch. If the first SBB first interface is disconnected from the LAN switch and the second SBB, and the second SBB is connected to the LAN switch, the second SBB acts as the primary SBB. As the primary, the second SBB provides access to NAS stacking network directory structure in response to an inquiry from a client computer connected to the LAN switch.

If prior to disconnecting the first SBB from the LAN switch, a client computer stores a first client file in the first SBB storage drive, the second SBB supplies a directory structure indicating that the first file is unavailable, in response to a request to read the first file. The second SBB also indicates that the first SBB is not connected to the NAS stacking network.

Additional details of the above-described method, and a system for NAS stacking, are provided below.

DETAILED DESCRIPTION

As used in this application, the terms "component," "module," "system," and the like are intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
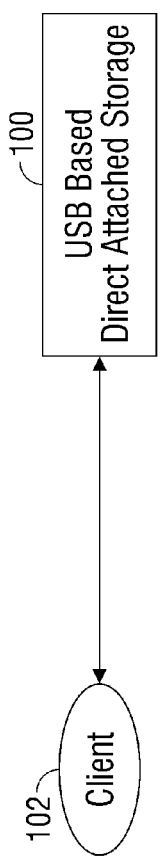
FIG. 1 is a schematic block diagram of a direct-attached storage (DAS) system (prior art).
Figure 2:
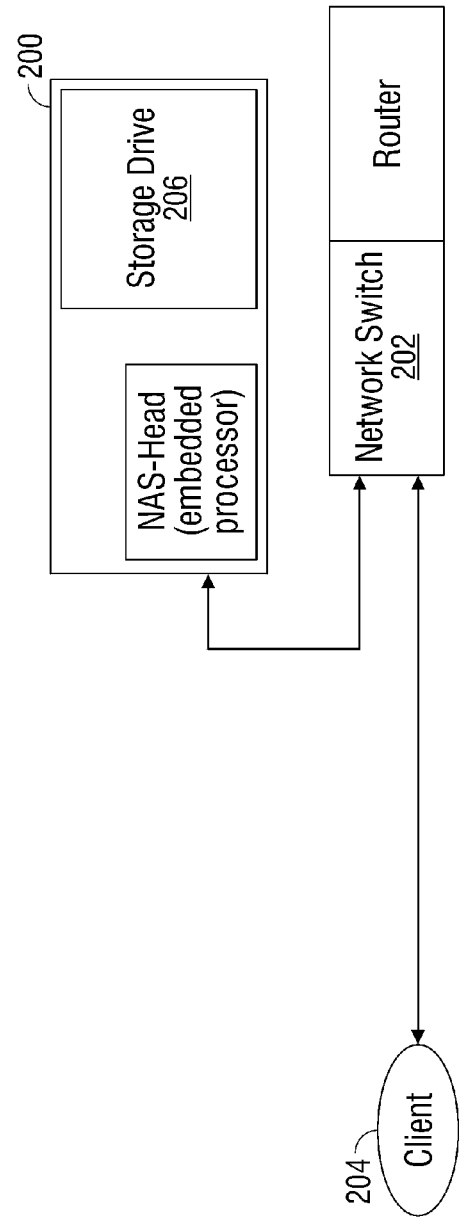
FIG. 2 is a schematic block diagram of a NAS system (prior art).
Figure 3:
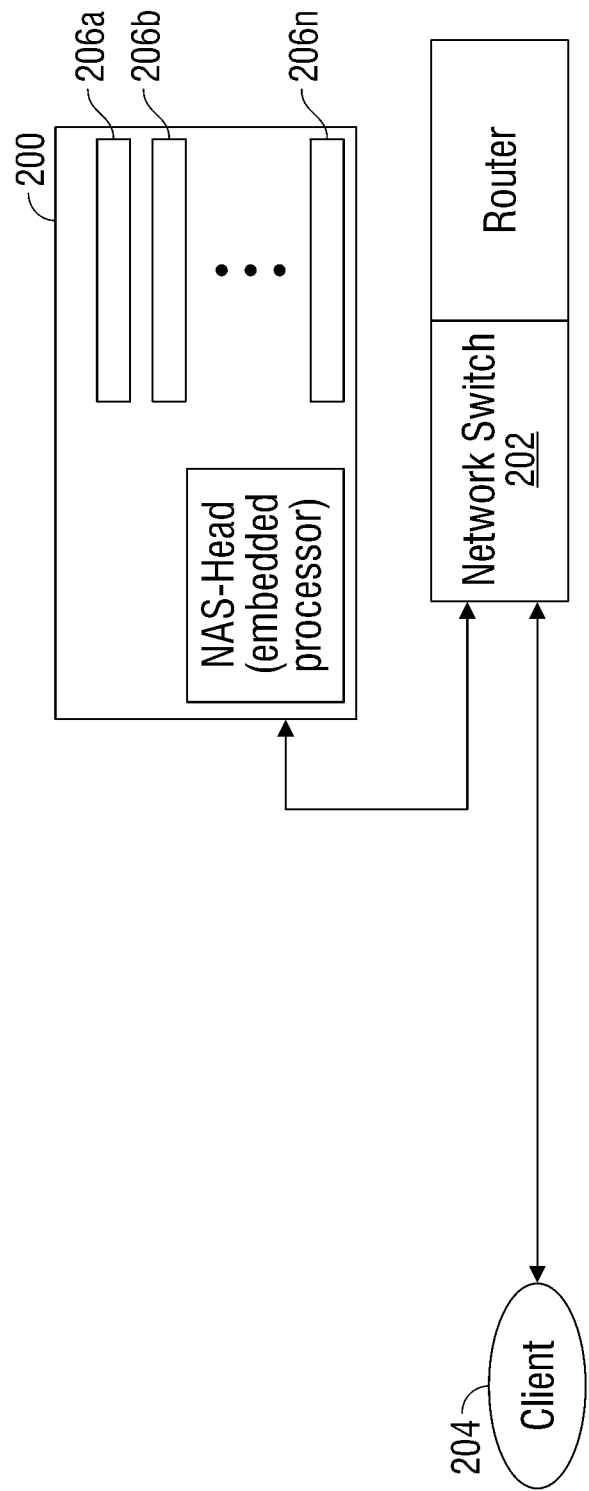
FIG. 3 is a schematic block diagram of a NAS system with multiple disk drives (prior art).
Figure 4:
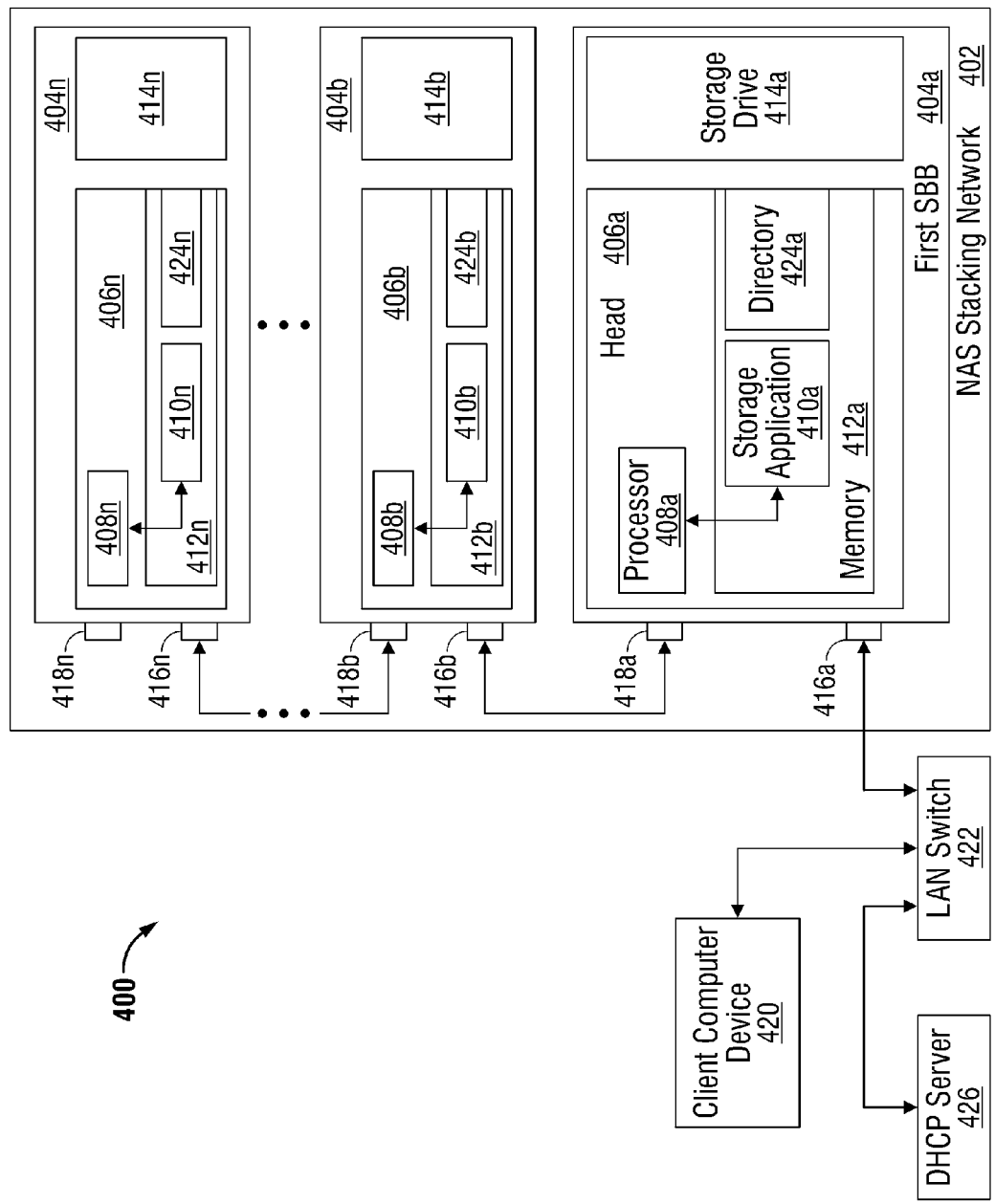
FIG. 4 is a schematic block diagram of a system for network attached storage (NAS) stacking.

FIG. 4 is a schematic block diagram of a system for network attached storage (NAS) stacking. The system 400 comprises a NAS stacking network 402 including at least a first and second stackable building block (SBB). Shown are first SBB 404a, second SBB 404b, and nth SBB 404n, where n is a variable not limited to any particular value. Each SBB includes a head 406 with an embedded processor 408 and storage application 410 enabled as a sequence of software instructions stored in a computer-readable memory 412 and executed by the processor 408. Each SBB also includes a storage drive 414 with client files, a first interface 416, and a second interface 418.

The first interface 416a of the first SBB 404a is connected to a client computer device 420 via a LAN switch 422, and the second interface 418a of the first SBB is connected to the first interface 416b of the second SBB 404b. The first interface 416n of the nth SBB 404n is connected to the second interface 418b of the second SBB 404b. The first, second, and nth SBBs 404 each includes a directory 424 of all client files stored in the stacking network 402. Thus, the directory 424a of the first SBB 404a includes any client files stored in the second and nth SBB storage devices 414b/414n. The first, second, and nth SBBs 404 each includes a metadata file describing every client file stored in the NAS stacking network.

The client computer device and each SBB typically employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with position calculation. Alternately, these functions, or some of these functions may be performed in hardware. The practical implementation of a master host as a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

As connected in FIG. 4, the first SBB 404a is the primary SBB providing access to NAS stacking network directory structure in response to a request. The second SBB 404b is a secondary SBB, connected to the client computer device 420 via the first SBB 404a. Likewise, the nth SBB 404n is a secondary SBB, connected to the client computer device 420 via the first SBB 404a and the second SBB 404b.

The first SBB 404a determines it is the primary SBB by issuing a dynamic host configuration protocol (DHCP) request for an Internet Protocol (IP) address via its first and second interfaces 416a/418a, and receiving a response from a DHCP server 426 via the first interface 416a. In other aspects not shown, the DHCP server may reside with the client computer device. The first SBB 404a, acting as the primary, provides an IP address for the second SBB 404b in response to a non-DHCP request for the second SBB IP address. The first SBB 404a provides the same service for the nth SBB 404n. The second SBB 404b determines it is the secondary SBB by issuing a DHCP request for an IP address via its first and second interfaces 416b/418b, and not receiving a response. The nth SBB 404n determines it is a secondary SBB using the same mechanism. Ordinarily, a DHCP protocol client sends out a DHCPDiscovery message and receives back a DHCPoffer message from the DHCP server, if present. In the case of the second and nth SBBs, the client times-out and does not receive back a DHCPoffer message, since it is connected to primary SBB or another secondary SBBs, none of which respond with a DHCPoffer message.

Figure 5:
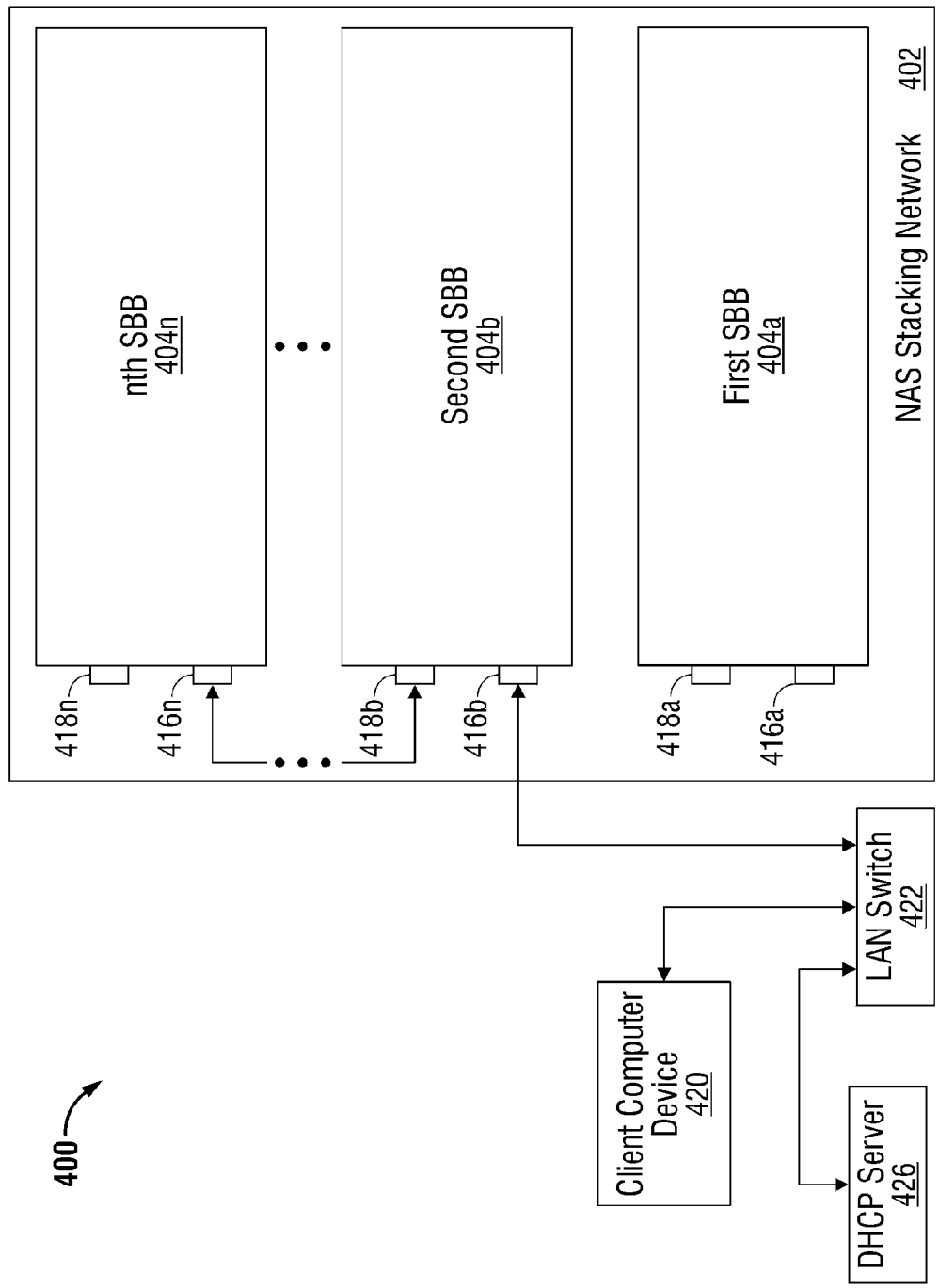
FIG. 5 is a schematic block diagram depicting a variation of the NAS stacking system of FIG. 4.

FIG. 5 is a schematic block diagram depicting a variation of the NAS stacking system of FIG. 4. The first SBB first interface 416a has been disconnected from the LAN switch 422 and the second interface 418a is disconnected from the second SBB first interface 416b. For example, the first SBB may be disconnected because it is broken. The second SBB 404b becomes the primary SBB in response to connecting either its first interface 416b or its second interface 418b to the LAN switch 422. As shown, the second SBB first interface 416b is connected to the LAN switch 422, and the second interface 418b remains connected to the nth SBB 404n. The nth SBB 404n remains a secondary SBB.

If the first SBB 404a has a first client file stored in its storage drive 414a, then the second SBB 404b, acting as the primary SBB, supplies a directory structure indicating that the first file is unavailable, in response to a request to read the first file. In another aspect, the second SBB 404b also supplies a directory structure indicating that the first SBB 404a is not connected to the NAS stacking network 402.

Functional Description

Referencing FIGS. 4 and 5, any SBB can be primary or secondary SBB, depending upon how it is connected. Every SBB has full copy of aggregate metadata. Irrespective of which module is primary, the client computer device is presented with a consistent/same view of the directory structure. The directory structure remains unmodified, irrespective of which SBB is primary.

Any port of SBB can be a networking port or stacking port. A networking port is the port that either directly or indirectly connects a SBB to the LAN switch. Whether a port is a networking or stacking port is determined automatically as part of the DHCP protocol. The standard DHCP for non-networking ports initially fails. After that phase all SBBs carry out a proprietary networking protocol which configures private IP addresses for SBBs for ports other than the networking port. These IP addresses are valid only within the context of stacking network.

No files cross between SBBs. If, upon bring-up, one of the initially connected SBBs is no longer connected, then the client sees a message in the directory structure in the form of a modified filename for the missing file. For example, the client sees all the directories and files present in connected SBB, and a message "missing n NASbox_modules.readme_for_helpful_hints.txt" for all of the directories on the missing SBB. Since no file ever spans across two SBBs, the whole directory structure is synced-up if any SBB is added or removed.

SBB management can be performed through a browser interface installed on the client computer device, by going to the page at the IP address associated with the NAS, or the hosted account page associated with the NAS. All of the SBBs in the NAS stack are managed through the primary module.

Figure 6:
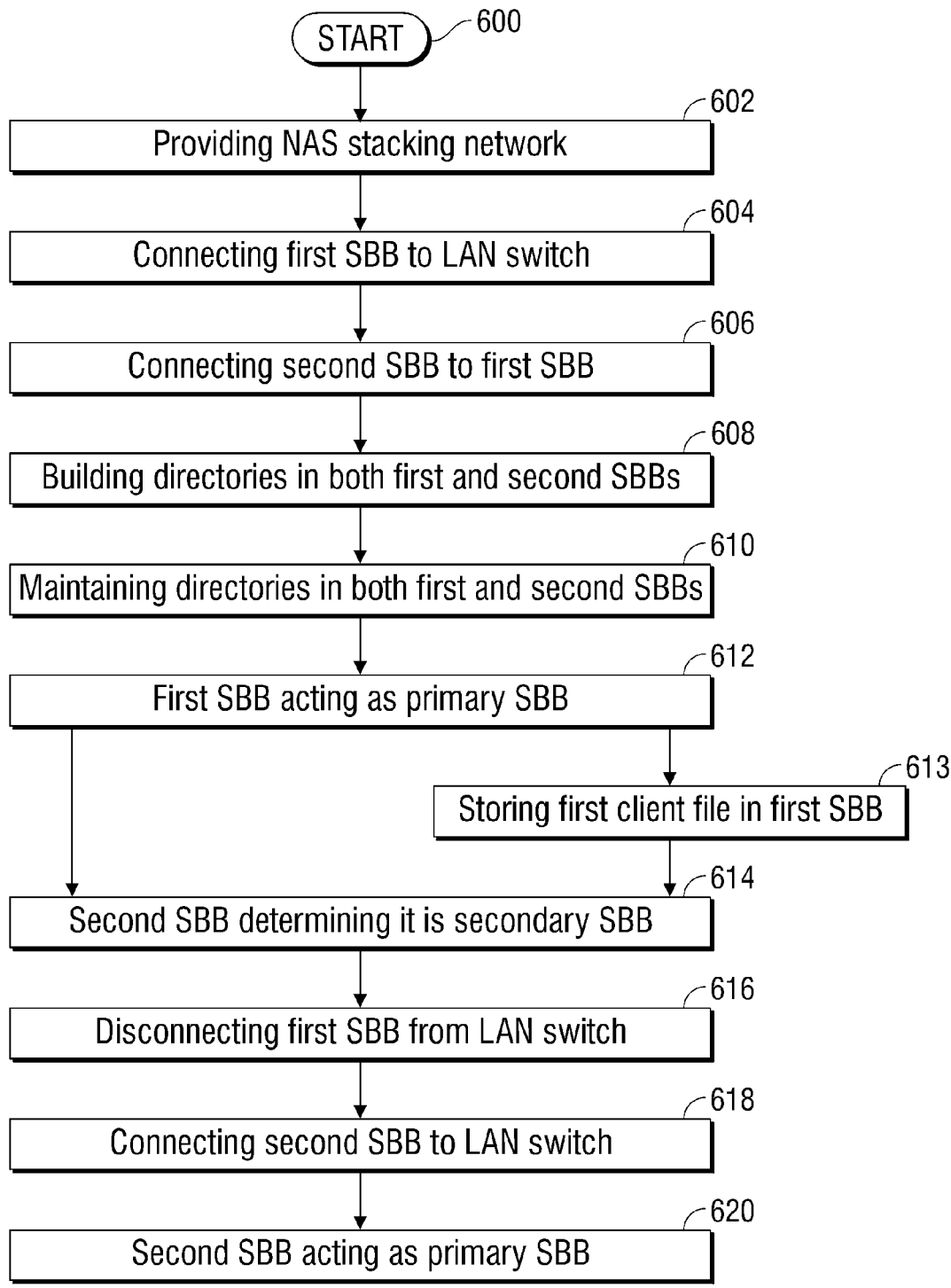
FIG. 6 is a flowchart illustrating a method for stacking storage drives in a NAS system.

FIG. 6 is a flowchart illustrating a method for stacking storage drives in a NAS system. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 600.

Step 602 provides a NAS stacking network including at least a first and second SBB, where each SBB includes a head, with an embedded processor and storage application, and a storage drive including client files. The storage application is enabled as a sequence of software instructions stored in a computer-readable memory and executed by the processor. Step 604 connects a first interface of the first SBB to a client computer device via a LAN switch. Step 606 connects a second interface of the first SBB to the first interface of the second SBB. Step 608 builds a directory of client files stored in the first and second SBBs. Step 610 maintains the directory in both the first and second SBBs. In one aspect, Step 610 includes both the first and second SBBs maintaining a metadata file describing every client file stored in the NAS stacking network.

In Step 612 the first SBB, acting as a primary SBB, provides access to NAS stacking network directory structure in response to an inquiry from a client computer connected to the LAN switch. Step 612 includes the first SBB determining it is the primary SBB by issuing a DHCP request for an IP address via its first and second interfaces, and receiving a response from a DHCP server via the first interface. Step 612 also includes the first SBB providing an IP address for the second SBB in response to a non-DHCP request for the second SBB IP address.

In Step 614 the second SBB determines it is the secondary SBB by issuing a DHCP request for an IP address via its first and second interfaces, and not receiving a response.

Step 616 disconnects the first SBB first interface from the LAN switch and the second interface from the second SBB first interface. Step 618 connects a second SBB interface, either the first interface or second interface, to the LAN switch. In Step 620 the second SBB, acting as the primary SBB, provides access to NAS stacking network directory structure in response to an inquiry from a client computer connected to the LAN switch.

In one aspect, prior to disconnecting the first SBB from the LAN switch in Step 616, a client computer stores a first client file in the first SBB storage drive. Then, in Step 620 the second SBB supplies the directory structure indicating that the first file is unavailable, in response to a request to read the first file. Step 620 may further include the second SBB supplying a directory structure indicating that the first SBB is not connected to the NAS stacking network.

A NAS stacking system and method have been provided. Examples of particular protocols and hardware devices have been used to illustrate the invention. However, the invention is not limited to merely these examples. Other variations and embodiments of the invention will occur to those skilled in the art.

I claim:

1. A system for network attached storage (NAS) stacking, the system comprising:

a NAS stacking network comprising at least a first and second stackable building block (SBB), the first SBB and the second SBB respectively comprising:
  a head with an embedded processor and storage application enabled as a sequence of software instructions stored in a computer-readable memory and executed by the processor;
  a storage drive comprising client files; and
  a first interface and a second interface;
  wherein the first interface of the first SBB is connected to a client computer device via a local area network (LAN) switch and the second interface of the first SBB is connected to the first interface of the second SBB, and wherein the first SBB and the second SBB respectively comprise a directory of all client files stored in the first SBB and the second SBB.

2. The system of claim 1, wherein the first SBB is a primary SBB configured for providing access to NAS stacking network directory structure in response to a request.

3. The system of claim 2, wherein the second SBB is a secondary SBB connected to the client computer device via the first SBB.

4. The system of claim 3, wherein the first SBB determines it is the primary SBB by issuing a dynamic host configuration protocol (DHCP) request for an Internet Protocol (IP) address via the first and second interfaces of the first SBB, and receiving a response from a DHCP server via the first interface of the first SBB.

5. The system of claim 4, wherein the first SBB, acting as the primary SBB, provides an IP address for the second SBB in response to a non-DHCP request for the IP address of second SBB.

6. The system of claim 3, wherein the second SBB determines it is the secondary SBB by issuing a dynamic host configuration protocol (DHCP) request for an Internet Protocol (IP) address via at least one of the first interface or the second interface of the second SBB, and not receiving a response to the DHCP request.

7. The system of claim 2,
  wherein the second SBB becomes the primary SBB in response to the first interface of the first SBB becoming disconnected from the LAN switch, the second interface of the first SBB becoming disconnected from the second SBB, and one of the first interface or the second interface of the second SBB becoming connected to the LAN switch.

8. The system of claim 7, wherein the storage drive of the first SBB stores a first file; and
  wherein the second SBB, acting as the primary SBB, supplies a directory structure indicating that the first file is unavailable in response to a request to read the first file.

9. The system of claim 8, wherein the second SBB is configured for supplying a directory structure indicating that the first SBB is not connected to the NAS stacking network.

10. The system of claim 1, wherein the first SBB and the second SBB respectively comprise a metadata file describing every client file stored in the first SBB and the second SBB.

11. A method for stacking storage drives in a network attached storage (NAS) system, comprising:
  providing a NAS stacking network comprising at least a first stackable building block (SBB) and a second SBB, wherein each of the first SBB and the second SBB comprises a head with an embedded processor and storage application enabled as a sequence of software instructions stored in a computer-readable memory and executed by the processor, and a storage drive comprising one or more client files;
  connecting a first interface of the first SBB to a client computer device via a local area network (LAN) switch;
  connecting a second interface of the first SBB to the first interface of the second SBB;
  building a directory of client files stored in the first SBB and the second SBB; and
  maintaining the directory in both the first SBB and the second SBB.

12. The method of claim 11, further comprising:
  providing, by the first SBB acting as a primary SBB, access to a NAS stacking network directory structure in response to an inquiry from a client computer connected to the LAN switch.

13. The method of claim 12, further comprising:
  disconnecting the first interface of the first SBB from the LAN switch and the second interface of the first SBB from the first interface of the second SBB;
  connecting one of the first interface of the second SBB or the second interface of the second SBB to the LAN switch; and
  providing, by the second SBB acting as the primary SBB, access to the NAS stacking network directory structure in response to an inquiry from a client computer connected to the LAN switch.

14. The method of claim 13, further comprising:
  prior to disconnecting the first interface of the first SBB from the LAN switch, a storing a first file in the storage drive of the first SBB; and
  wherein the providing access to the NAS stacking network directory structure comprises supplying, by the second SBB, a directory structure indicating that the first file is unavailable in response to a request to read the first file.

15. The method of claim 14, wherein the supplying the directory structure comprises supplying, by the second SBB, the directory structure indicating that the first SBB is not connected to the NAS stacking network.

16. The method of claim 12, wherein the first SBB acting as the primary SBB comprises determining that the first SBB is the primary SBB by issuing a dynamic host configuration protocol (DHCP) request for an Internet Protocol (IP) address via at least one of the first interface of the first SBB or the second interface of the first SBB, and receiving a response from a DHCP server via the first interface of the first SBB.

17. The method of claim 16, wherein the first SBB acting as the primary SBB comprises providing, by the first SBB, an IP address for the second SBB in response to a non-DHCP request for the IP address for the second SBB.

18. The method of claim 16, further comprising:
  issuing, by the second SBB, a DHCP request for an IP address via at least one of the first interface of the second SBB or the second interface of the second SBB; and
  determining that the second SBB is the secondary SBB in response to not receiving a response to the DHCP request.

19. The method of claim 11, wherein maintaining the directory comprises maintaining a metadata file on the first SBB and the second SBB, the metadata file describing every client file stored in the first SBB and the second SBB.

* * * * *